(12) United States Patent
Suzuki

(10) Patent No.: US 9,448,871 B2
(45) Date of Patent: Sep. 20, 2016

(54) INFORMATION PROCESSING DEVICE AND METHOD FOR SELECTING PROCESSOR FOR MEMORY DUMP PROCESSING

(71) Applicant: FUJITSU LIMITED, Kawasaki-shi, Kanagawa (JP)

(72) Inventor: Yasuo Suzuki, Kokubunji (JP)

(73) Assignee: FUJITSU LIMITED, Kawasaki (JP)

( * ) Notice: Subject to any disclaimer, the term of this patent is extended or adjusted under 35 U.S.C. 154(b) by 440 days.

(21) Appl. No.: 14/051,956

(22) Filed: Oct. 11, 2013

(65) Prior Publication Data

US 2014/0040670 A1 Feb. 6, 2014

Related U.S. Application Data

(63) Continuation of application No. PCT/JP2011/002364, filed on Apr. 22, 2011.

(51) Int. Cl.
G06F 11/00 (2006.01)
G06F 11/07 (2006.01)
G06F 9/50 (2006.01)

(52) U.S. Cl.
CPC .......... *G06F 11/0778* (2013.01); *G06F 9/505* (2013.01); *G06F 11/0724* (2013.01)

(58) Field of Classification Search
CPC .......... G06F 11/0724; G06F 11/0778; G06F 9/5044; G06F 9/505
See application file for complete search history.

(56) References Cited

U.S. PATENT DOCUMENTS

| | | | | |
|---|---|---|---|---|
| 5,293,612 A | * | 3/1994 | Shingai | G06F 11/0724 711/159 |
| 6,199,179 B1 | * | 3/2001 | Kauffman | G06F 9/5077 714/11 |
| 8,677,374 B2 | * | 3/2014 | Aslot | G06F 9/45558 714/2 |
| 2005/0240806 A1 | * | 10/2005 | Bruckert | G06F 9/52 714/6.11 |
| 2007/0101191 A1 | * | 5/2007 | Iwama | G06F 11/0712 714/15 |
| 2007/0150435 A1 | | 6/2007 | Murakawa | |
| 2008/0320487 A1 | | 12/2008 | Fontenot | |
| 2010/0083250 A1 | | 4/2010 | Nakai | |
| 2010/0251219 A1 | | 9/2010 | Peacock et al. | |
| 2011/0225459 A1 | * | 9/2011 | Fahrig | G06F 11/366 714/37 |
| 2011/0296212 A1 | * | 12/2011 | Elnozahy | G06F 1/3203 713/320 |
| 2013/0111264 A1 | * | 5/2013 | Settsu | G06F 11/0778 714/11 |

FOREIGN PATENT DOCUMENTS

| | | |
|---|---|---|
| EP | 0-351-109 | 1/1990 |
| JP | 2-155055 | 6/1990 |

(Continued)

OTHER PUBLICATIONS

Extended European Search Report issued Apr. 4, 2014 in European Patent Application No. 11863993.9.

(Continued)

*Primary Examiner* — Marc Duncan
(74) *Attorney, Agent, or Firm* — Staas & Halsey LLP

(57) ABSTRACT

An information processing device includes a memory, and a plurality of processors coupled to the memory and including cache memories, and configured to select a processor where a capacity of the cache memory is the smallest among the plurality of processors, the selected processor executes memory dump processing for the memory.

16 Claims, 15 Drawing Sheets

(56) References Cited

FOREIGN PATENT DOCUMENTS

| JP | 2001-34508 | 2/2001 |
|---|---|---|
| JP | 2005-190372 | 7/2005 |
| JP | 2007-94537 | 4/2007 |
| JP | 2009-3942 | 1/2009 |
| JP | 2009-129101 | 6/2009 |

OTHER PUBLICATIONS

International Search Report mailed May 24, 2011 in corresponding International Application No. PCT/JP2011/002364.

* cited by examiner

FIG. 5

| NODE | DISTANCE FROM SBSP, EXPRESSED BY SLIT | CAPACITY OF WHOLE AREA OF MEMORY IN MAIN MEMORY (GB) | CACHE MEMORY CAPACITY (MB) |
|---|---|---|---|
| 10 | #10 | 256 | 24 |
| 11 | #11 | 256 | 24 |
| 12 | #12 | 64 | 24 |
| 13 | #13 | 128 | 21 (PRESENCE OF DEGENERACY) |

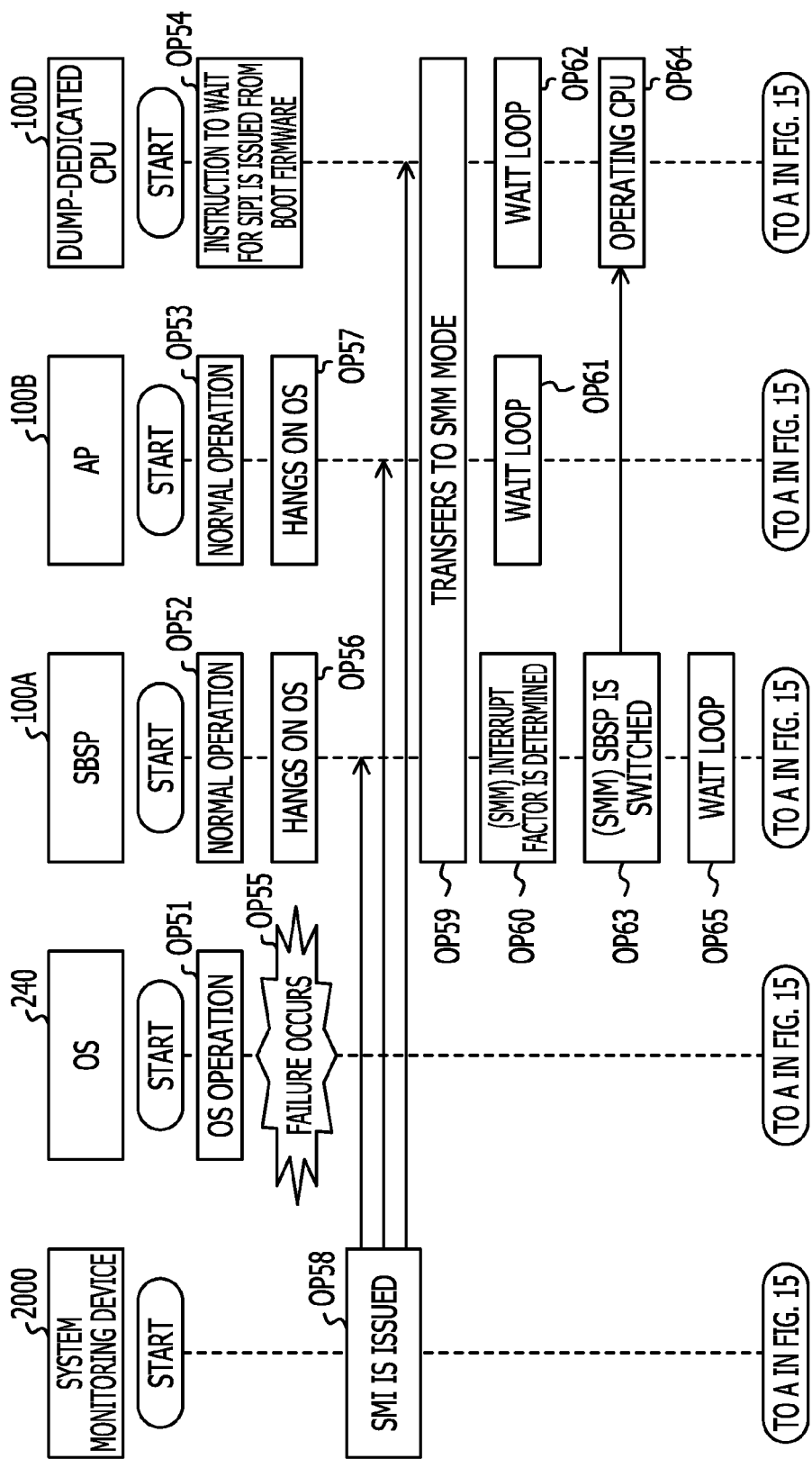

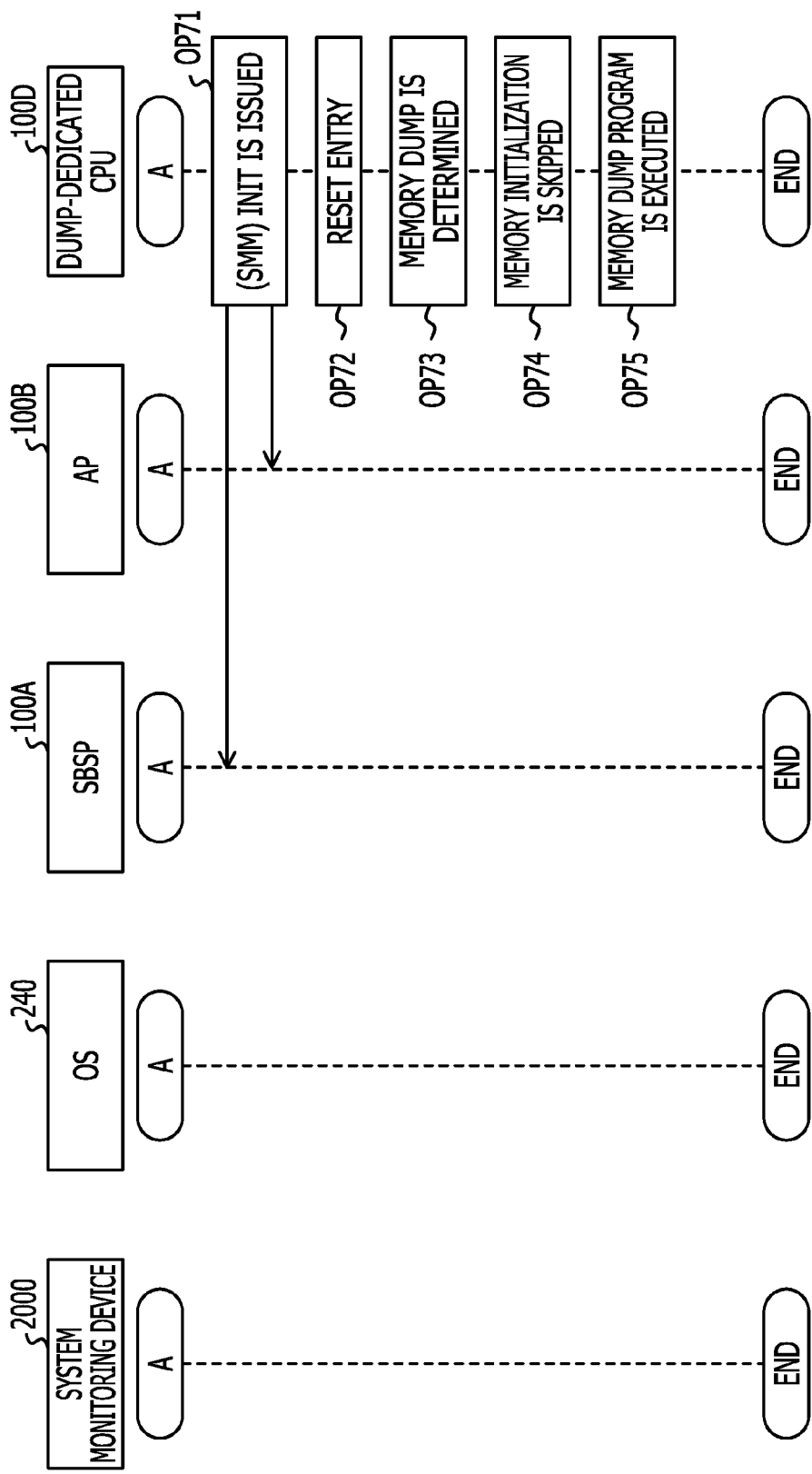

INFORMATION PROCESSING DEVICE AND METHOD FOR SELECTING PROCESSOR FOR MEMORY DUMP PROCESSING

CROSS-REFERENCE TO RELATED APPLICATION

This application is a continuation application of International Application PCT/JP2011/002364 filed on Apr. 22, 2011 and designated the U.S., the entire contents of which are incorporated herein by reference.

FIELD

A disclosed technology relates to an information processing device and a processing method for an information processing device.

BACKGROUND

When, in the Operating System (OS) of a computer system, a failure has occurred that is too serious to continue processing, data at the time of the failure is collected so as to find the cause of the failure of the corresponding OS. The collected data is stored in a storage device. The stored data is typically called a memory dump.

As a collection mechanism for this memory dump, there has been a method where when a memory dump collection program has been preliminarily installed and a failure occurrence has been detected, the memory dump collection program is activated owing to an interrupt from an input mechanism or the like, and memory data is collected. For example, in Linux, a crash kernel is caused to continuously remain on a memory in advance, the crash kernel being used for outputting a kernel dump in a kernel serving as the nucleus of an OS. When a kernel panic has occurred, processing transfers from a usual kernel to the crash kernel, and the kernel dump is acquired.

In addition, as another memory data collection mechanism, there has been a method where a computer system is reset with holding memory data at the time of a failure, a memory data collection program different from a routinely operating OS is activated after the reset, and the held memory data is collected. The reset is a type of interrupt. So as to reset the computer system with holding this memory data, usually a function called Warm Reset is used that does not turn off the power supply of the computer system at the time of the reset.

As related arts, Japanese Laid-open Patent Publication Nos. 2009-129101, 2007-94537, and so forth may be cited.

SUMMARY

According to an aspect of the invention, an information processing device includes a memory, and a plurality of processors coupled to the memory, including cache memories, and configured to select a processor where a capacity of the cache memory is the smallest among the plurality of processors, the selected processor executes memory dump processing for the memory.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates a table explaining a dump-dedicated CPU selection factor in the present embodiment.

FIG. 14 is a sequence diagram illustrating processing operations of an SBSP, an AP, and a dump-dedicated CPU at the time of a failure occurrence in the present embodiment.

FIG. 15 is a sequence diagram illustrating processing operations of the SBSP, the AP, and the dump-dedicated CPU at the time of a failure occurrence in the present embodiment.

DESCRIPTION OF EMBODIMENTS

In an information processing device executing a virtual machine, the processing of the virtual machine does not operate in conjunction with an OS serving as a platform, there has been an information processing device where the interrupt of the OS serving as a platform is not accepted, so as to avoid a situation that processing difficult to halt within the virtual machine is halted owing to the interrupt of the OS serving as a platform.

More specifically, there has been a problem that when a failure has occurred in an information processing device executing a virtual machine, it becomes difficult to perform the interrupt of a memory dump collection program and, as a result, it is difficult to acquire a memory dump.

An object of the disclosed technology is to provide an information processing device and a processing method for an information processing device, which are capable of acquiring a memory dump even if a failure has occurred in an OS executing a virtual machine.

So as to solve the above mentioned problem, according to a first aspect of the disclosed technology, an information processing device is provided that includes a memory, a storage unit configured to store therein software including a memory dump program used for executing memory dump processing for the memory, a plurality of processors configured to access the memory, a determination unit configured to determine the capacity of an available cache memory in each of the plurality of processors, a selection unit configured to select a processor where the capacity of an available cache memory is the smallest, as a determination result of the determination unit, and a processing unit configured to cause the processor selected by the selection unit to execute the memory dump program and cause the other processors to execute processing of other software.

According to the disclosed technology, it is possible for a dedicated processor to perform memory dump processing independently from an OS. Therefore, in an information processing device executing a virtual machine whose interrupt processing is not available for an OS, it is also possible to execute a memory dump. Furthermore, a plurality of processors are included that have cache memories, and a CPU having the smallest available cache memory is selected to be used for a memory dump. By causing the other processors to perform usual processing, it is possible to suppress the reduction of a processing capacity when a memory dump is performed.

Hereinafter, the disclosed technology will be described in detail using drawings.

Figure 1:
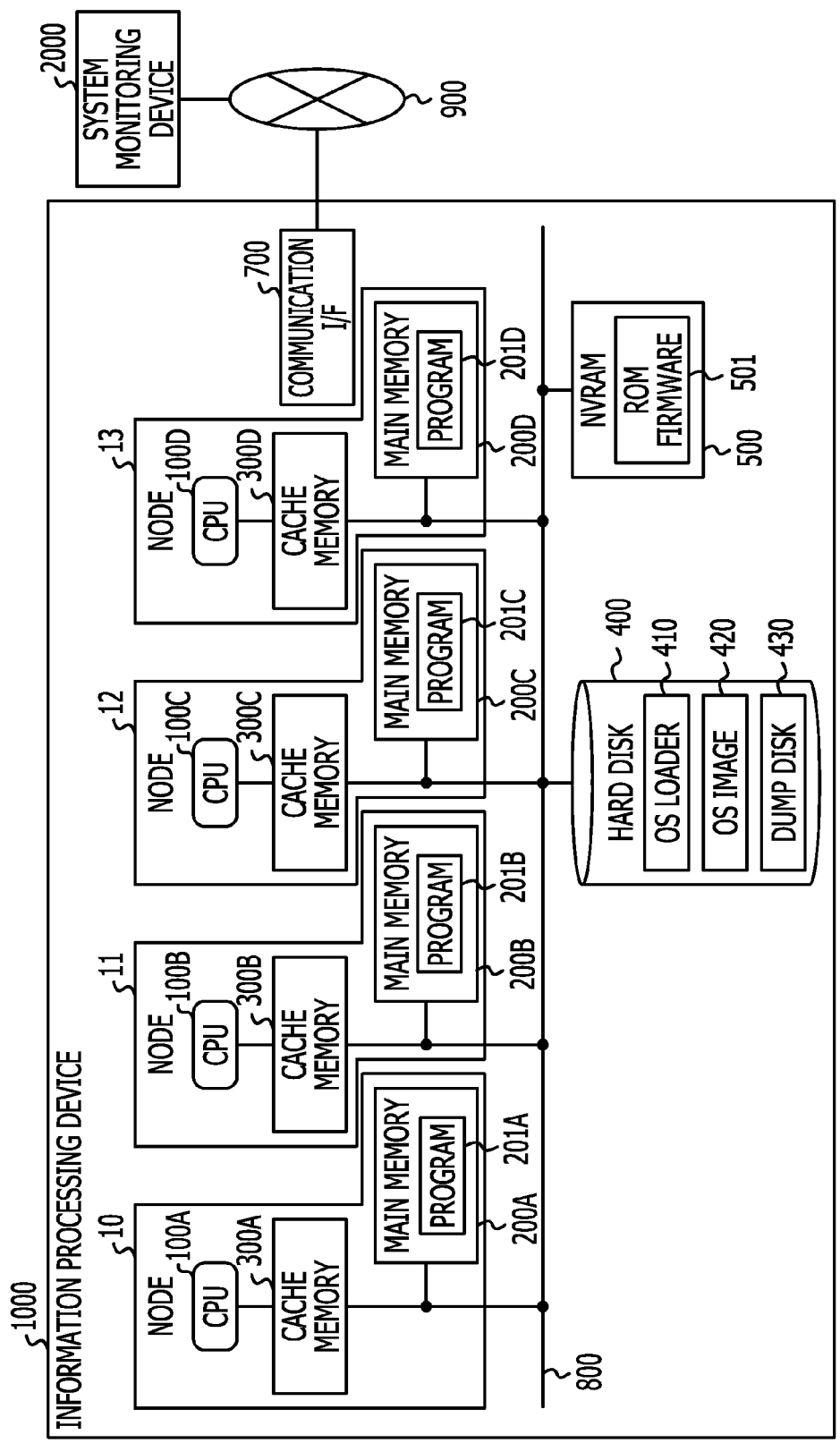
FIG. 1 is a diagram illustrating an example of a configuration of an information processing device in the present embodiment.

FIG. 1 is a diagram illustrating an example of the configuration of an information processing device 1000 in the present embodiment. As illustrated in FIG. 1, the information processing device 1000 includes nodes 10 to 13, a hard disk 400, a Non-Volatile Random Access Memory (NVRAM) 500, and a communication interface 700.

The node 10 includes a Central Processing Unit (CPU) 100A, a main memory 200A, and a cache memory 300A coupled to each other. The node 11 includes a CPU 100B, a main memory 200B, and a cache memory 300B coupled to each other. The node 12 includes a CPU 100C, a main memory 200C, and a cache memory 300C coupled to each other. The node 13 includes a CPU 100D, a main memory 200D, and a cache memory 300D coupled to each other. The nodes 10 to 13 are coupled to one another owing to a bus 800. In the information processing device 1000, Non-Uniform Memory Access (NUMA) is adopted. In addition, the nodes 10 to 13 include the same structure. Hereinafter, the node 10 will be described, the same symbol will be assigned to the same configuration as a configuration described in the node 10, in the nodes 11 to 13, and the description thereof will be omitted.

The CPU 100A is coupled to the cache memory 300A through the bus 800. The CPU 100A executes various kinds of processing in the node 10.

The main memory 200A is coupled to the cache memory 300A through the bus 800. The main memory 200A stores therein at least portions of the program of an OS the CPU 100A executes and a program 201A for controlling the node 10. In addition, the main memory 200A stores therein various kinds of data desired for processing in the CPU 100A.

The cache memory 300A is provided with intent to speed up, for example, READ/WRITE I/O processing (hereinafter, simply referred to as "access") between the CPU 100A and the main memory 200A. The cache memory 300A stores therein a portion of data to be written into the main memory 200A in response to the access of the CPU 100A. The cache memory 300A stores therein a portion of data read from the main memory 200A in response to the access of the CPU 100A. By storing a portion of data in the cache memory 300A, it is possible for the CPU 100A to read data from the cache memory 300A without accessing the main memory 200A. In addition, in FIG. 1, the cache memory 100A is illustrated as a cache memory physically different from the CPU 100A. However, the cache memory 300A may also have the configuration of being embedded in the CPU 100A.

Through the bus 800, the hard disk 400 is coupled to the nodes 10 to 13, the NVRAM 500, and the communication interface 700. The hard disk 400 stores therein an OS loader 410, an OS image 420, and a dump disk 430.

The OS loader 410 is a program used for causing the OS stored in the hard disk 400 to be read into the main memories 200A to 200D.

The OS image 420 is data where the contents and the structures of files in the main memories 200A to 200D are individually stored in one file.

When, in the OS 240 the CPUs 100A to 100D execute, a failure has occurred that is too serious to continue processing, the content of data the main memories 200A to 200D and the cache memories 300A to 300D store therein is stored in the dump disk 430. At the time of a failure occurrence in the OS 240, data including the context information of the CPUs 100A to 100D is stored in the dump disk 430. The content of data the main memories 200A to 200D and the cache memories 300A to 300D store therein is used as material for failure investigation. The context information of the CPUs 100A to 100D is used for restoring the execution states of all the CPUs 100A to 100D having operated. The data stored in the dump disk 430 is typically called a memory dump.

Through the bus 800, the NVRAM 500 is coupled to the nodes 10 to 13, the hard disk 400, and the communication interface 700. The NVRAM 500 stores therein Read Only Memory (ROM) firmware 501.

The ROM firmware 501 stores, in the main memories 200A to 200D, boot firmware read from a predetermined address in the NVRAM 500. The ROM firmware 501 deploys boot firmware 210 described later in FIG. 2, on the main memories 200A to 200D as the executable boot firmware 210.

The communication interface 700 is provided so that the information processing device 1000 is coupled to a system monitoring device 2000 through a network 900. The communication interface 700 provides the function of an interface performing the transmission and reception of data between the nodes 10 to 13 and the system monitoring device 2000.

The system monitoring device 2000 is coupled to the communication interface 700 in the information processing device 1000 through the network 900. Owing to remote control, the system monitoring device 2000 performs the ON or OFF of the power supply of the information processing device 1000. The system monitoring device 2000 sets and cancels the partitions of the nodes 10 to 13 in the information processing device 1000. The system monitoring device 2000 displays the device information of the nodes 10 to 13. The system monitoring device 2000 points to the failure points of the nodes 10 to 13. Using the CPUs 100A to 100D, the system monitoring device 2000 executes degeneracy processing for the cache memories 300A to 300D the nodes 10 to 13 include.

In addition, the CPU 100A operating as a System Bootstrap Processor (SBSP) operates as a memory allocation unit individually allocating the areas of the main memories 200A to 200D to the CPUs 100A to 100D. The SBSP is a CPU executing main processing at the time of the activation of the information processing device 1000, and one of the plurality of CPUs 100A to 100D is selected as the SBSP. In addition, the CPUs 100A to 100D have degeneracy functions for limiting and using the available ranges of the cache memories 300A to 300D in response to the states of the failures of the cache memories 300A to 300D.

Figure 2:
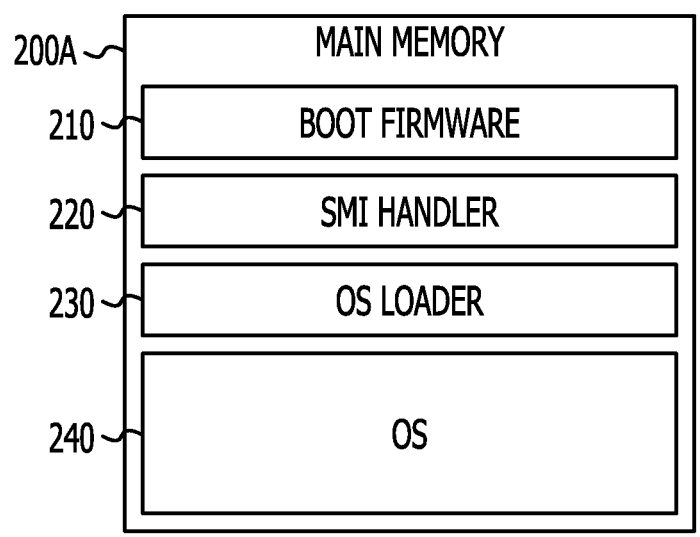
FIG. 2 is a diagram illustrating an example of a configuration of a main memory in the present embodiment.

FIG. 2 is a diagram illustrating the configuration of the main memory 200A in the node 10 in the information processing device 1000 in the present embodiment. The main memory 200A stores therein the boot firmware 210, a System Management Interrupt (SMI) handler 220, an OS loader 230, and the OS 240. In addition, the main memory 200A in the node 10 has the same configuration as the main memory 200B in the node 11, the main memory 200C in the node 12, and the main memory 200D in the node 13. In FIG. 2, the same symbol is assigned to the same configuration as the configuration described in FIG. 1, and the description thereof will be omitted.

The boot firmware 210 recognizes the implementation states of the main memories 200A to 200D the nodes 10 to 13 include. The boot firmware 210 causes the OS loader 230 and the OS 240 to operate under the implementation environments of the main memories 200A to 200D.

The SMI handler 220 includes a function for transferring to a System Management Mode (SMM) serving as one of the operation modes of the CPUs 100A to 100D, owing to a type of interrupt called a System Management Interrupt. The SMM is one of the operation modes of the CPUs 100A to 100D introduced into the x86 architecture of Intel Corporation. When having received the SMI, the CPUs 100A to 100D transfer to the SMM. The CPUs 100A to 100D having transferred to the SMM execute the SMI. The SMI is a program processing an SMI within an independent address space within the memory spaces of the main memories 200A to 200D, the independent address space being inaccessible from another operation mode. When the processing of the SMI has been completed, the CPUs 100A to 100D return to modes before the SMM transfer.

The OS loader 230 is a program used for causing the OS stored in the hard disk 400 to be read into the main memories 200A to 200D.

The OS 240 is a program the CPU 100A executes. The OS 240 includes a plurality of types. The OS 240 includes a virtual machine program where a plurality of virtual machines emulating a physical machine on the OS 240 operate.

At the time of the failure occurrence of the OS 240, the SMI is performed that is used for activating a memory dump collection program different from the OS 240. However, when a failure has been detected in the OS 240 causing the virtual machine to be executed, if the OS 240 performs an interrupt used for activating the memory dump collection program, there occurs a situation that processing not supposed to be interrupted within the virtual machine is interrupted. The reason is that processing within the virtual machine does not operate in conjunction with the OS 240 serving as a platform. So as to avoid such a situation, the virtual machine is protected from the interruption of the processing of the virtual machine operating on the OS 240, which is due to INIT.

A dump-dedicated CPU separation unit 211B described later in FIG. 6 performs processing for separating a selected dump-dedicated CPU from a normal operational system CPU and not allowing the selected dump-dedicated CPU to be used by the OS 240. Owing to the dump-dedicated CPU separation unit 211B, it is possible for the CPU 100D operating as the dump-dedicated CPU to perform memory dump processing independently from the OS 240. Therefore, in the information processing device 1000 executing a virtual machine whose interrupt processing is not available for the OS 240, it is also possible to execute a memory dump.

Figure 3:
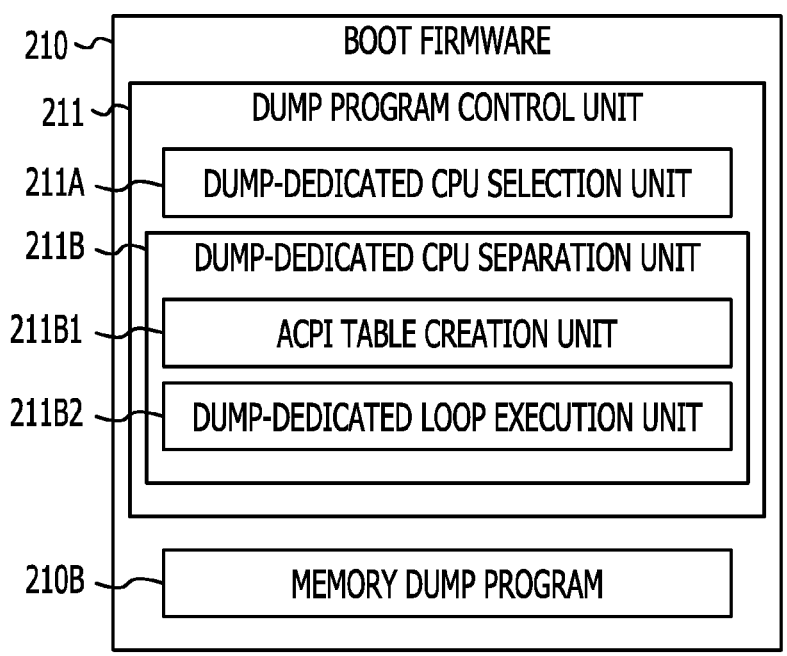
FIG. 3 is a diagram illustrating an example of a configuration of boot firmware in the present embodiment.

FIG. 3 is a diagram illustrating the configuration of the boot firmware 210 in the node 10 in the information processing device 1000 in the present embodiment. The boot firmware 210 includes a dump program control unit 211 and a memory dump program 210B. In addition, the boot firmware 210 in the node 10 has the same configuration as pieces of boot firmware in the nodes 11 to 13. In FIG. 3, the same symbol is assigned to the same configuration as the configuration described in FIG. 1 and FIG. 2, and the description thereof will be omitted.

The dump program control unit 211 includes a dump-dedicated CPU selection unit 211A and the dump-dedicated CPU separation unit 211B.

The dump-dedicated CPU selection unit 211A selects a dump-dedicated CPU at the time of the activation of the information processing device 1000, and controls the dump-dedicated CPU.

The dump-dedicated CPU separation unit 211B includes an Advanced Configuration and Power Interface (ACPI) table creation unit 211B1 and a dump-dedicated loop execution unit 211B2.

The ACPI table creation unit 211B1 creates an ACPI table. The ACPI table includes the hardware information of the information processing device 1000 including the CPUs 100A to 100D, the main memories 200A to 200D, and the cache memories 300A to 300D, included in the nodes 10 to 13. The ACPI table includes a System Locality Distance Information Table (SLIT) expressing distances between nodes. The ACPI table creation unit 211B1 notifies the OS 240 of the created ACPI table.

The dump-dedicated loop execution unit 211B2 instructs the selected dump-dedicated CPU to perform a wait loop from the boot firmware 210.

The memory dump program 210B is a program describing the processing content of a function used by the selected dump-dedicated CPU to perform a memory dump. By executing the memory dump program 210B, the selected dump-dedicated CPU executes memory dump processing.

Figure 4:
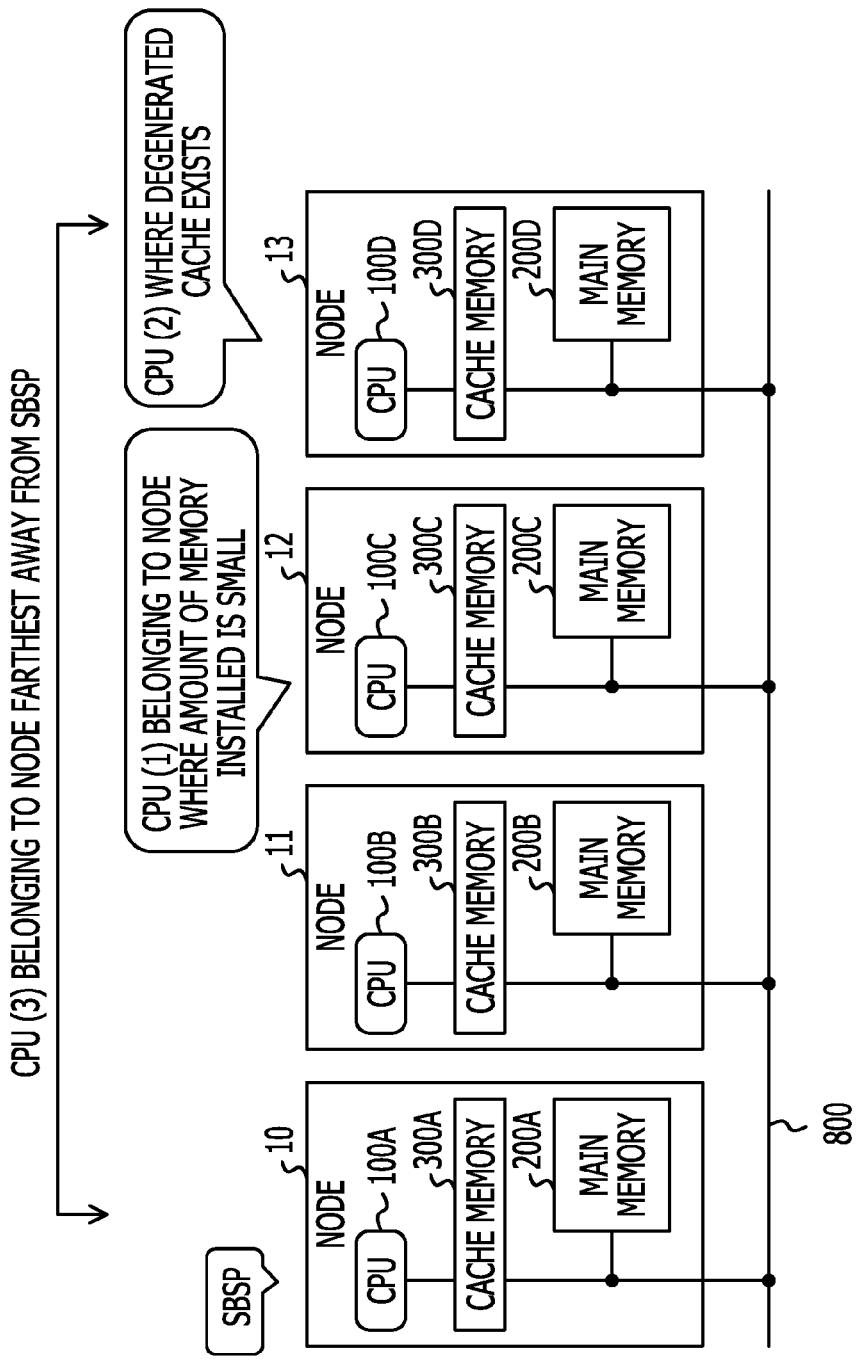
FIG. 4 illustrates a diagram explaining a dump-dedicated CPU selection factor in the present embodiment.

FIG. 4 is a diagram explaining the selection factor of a dump-dedicated CPU in the information processing device 1000 in the present embodiment. In FIG. 4, the same symbol is assigned to the same configuration as the configuration described in FIG. 1 to FIG. 3, and the description thereof will be omitted.

As illustrated in FIG. 4, a system into which the NUMA is applied includes the nodes 10 to 13 including the CPUs 100A to 100D, the main memories 200A to 200D, and the cache memories 300A to 300D. In the NUMA, the nodes 10 to 13 are coupled owing to the bus 800 functioning as an interconnection. It is possible for the CPUs 100A to 100D to use the main memories 200A to 200D included in the nodes 10 to 13.

When being based on the CPU 100A operating as the SBSP, the main memory 200A within the node 10 is called a local memory. In addition, the main memories 200B to 200D in the nodes 11 to 13 are called remote memories viewed from the CPU 100A. In the NUMA, when being based on the CPU 100A, an access time with respect to the main memory 200A serving as a local memory becomes shorter than access times with respect to the main memories 200B to 200D serving as remote memories. In addition, access times with respect to the main memories 200B to 200D serving as the remote memories of the CPU 100A increase in proportion to distances from the node including the SBSP to the individual nodes.

In addition, there is a case where the capacities of the whole areas of the memories of the individual main memories 200A, 200B, 200C, and 200D in the nodes 10 to 13 and the states of the CPUs 100A to 100D are uniform. In such a case, after taking into consideration the characteristic of the above-mentioned NUMA, the CPU 100D existing in the node 13 is selected as the dump-dedicated CPU, the node 13 being a node farthest away from the node including the CPU 100A serving as the SBSP. The reason why the dump-dedicated CPU is selected on the basis of the CPU 100A is that data serving as a nucleus when the kernel of the OS 240 is operated is stored in a remote memory near to the CPU 100A operating as the SBSP, with the local memory of the CPU 100A as a center. Furthermore, the reason is that whether an access time with respect to the kernel of the OS 240 is long or short directly affects the performances of the nodes 10 to 12. In other words, the dump-dedicated CPU is determined after taking into consideration a memory access delay and so forth. In addition, there is also a case where it is desirable that a CPU whose performance is degraded owing to the degeneracy of a cache memory corresponding to the CPU is used as the dump-dedicated CPU instead of being used as the normal operational system CPU.

In addition, the CPU 100A in the node 10 operates as the SBSP. The CPU 100A operating as the SBSP and the CPUs 100B to 100C other than the CPU 100D operating as dump-dedicated serve as Application Processors (AP) operating in accordance with the SBSP.

After taking into consideration a case where the memory implementation capacity of a main memory in a node is smaller than the other nodes or a case where the cache memories 300B to 300D in the nodes 11 to 13 are degenerated, the dump-dedicated CPU is also selected. There is a case where the capacity of the whole area of the memory of the main memory 200C in the node 12 is smaller than the capacities of the whole areas of the memories of the main memory 200B in the node 11 and the main memory 200D in the node 13. When the capacity of a local memory is small, the number of accesses to a remote memory increases. Therefore, after taking into consideration a memory capacity, the dump-dedicated CPU is selected. In addition, there is a case where the cache memory 300D in the node 13 is degenerated. When a cache memory is degenerated, the number of accesses to a cache memory in which no degeneracy exists increases. Therefore, after taking into consideration the presence or absence of the degeneracy of a cache memory, a CPU to operate as dump-dedicated is selected. A failure point is degenerated with a partial failure in the cache block of the cache memory 300D, and hence, the degeneracy of the cache memory 300D occurs. The dump-dedicated CPU is selected on the basis of the presences or absences of the degeneracies of the cache memories 300B to 300D in the nodes 11 to 13, described above, and the sizes of the capacities of the whole areas of the memories of the main memories 200B to 200D, and the SLIT of the ACPI. In addition, the nodes 10 to 13 include the same structure. Even if one of all the CPUs existing in the nodes 10 to 13 is selected as the dump-dedicated CPU, it is possible to execute a memory dump independently of an operation OS.

FIG. 5 illustrates a table explaining a selection factor for a dump-dedicated CPU in the information processing device 1000 in the present embodiment. Individual pieces of data in FIG. 5 correspond to dump-dedicated CPU selection factors in the present embodiment, described above in FIG. 4. In FIG. 5, the same symbol is assigned to the same configuration as the configuration described in FIG. 1 to FIG. 4, and the description thereof will be omitted.

As illustrated in FIG. 5, the distance of the node 10 from the SBSP, expressed by the SLIT, is 10. The capacity of the whole area of a memory in the main memory 200A in the node 10 is 256 GB. A cache memory capacity in the cache memory 300A in the node 10 is 24 MB. The distance of the node 11 from the SBSP, expressed by the SLIT, is 11. The capacity of the whole area of a memory in the main memory 200B in the node 11 is 256 GB. A cache memory capacity in the cache memory 300B in the node 11 is 24 MB. The distance of the node 12 from the SBSP, expressed by the SLIT, is 13. The capacity of the whole area of a memory in the main memory 200C in the node 12 is 64 GB. A cache memory capacity in the cache memory 300C in the node 12 is 24 MB. The distance of the node 13 from the SBSP, expressed by the SLIT, is 12. The capacity of the whole area of a memory in the main memory 200D in the node 13 is 128 GB. The cache memory 300D in the node 13 is degenerated. Therefore, a cache memory capacity in the cache memory 300D is 21 MB.

As illustrated in FIG. 5, when the presences or absences of the degeneracies of the cache memories 300B to 300D are compared in the nodes 11 to 13, it is understood that the cache memory 300D in the node 13 is degenerated. When it is assumed that the presences or absences of the degeneracies of the cache memories 300B to 300D are selection criteria for the dump-dedicated CPU, the CPU 100D in the node 13 is selected as the dump-dedicated CPU. In other words, a plurality of processors are included that have cache memories, and a CPU having the smallest available cache memory is selected to be used for a memory dump. By causing the other processors to perform usual processing, it is possible to suppress the reduction of a processing capacity when a memory dump is performed.

In addition, when the capacities of the whole areas of the memories of the main memories 200B to 200D are compared in the nodes 11 to 13, it is understood that the capacity of the whole area of the memory of the main memory 200C in the node 12 is the smallest. When it is assumed that the sizes of the capacities of the whole areas of the memories of the main memories 200B to 200D are selection criteria for the dump-dedicated CPU, the CPU 100C in the node 12 is selected as the dump-dedicated CPU. In addition, in the nodes 11 to 13, a CPU included in a node farthest away from a node including the SBSP is the CPU 100D in the node 13. When the dump-dedicated CPU is selected on the basis of the SLIT of the ACPI, the farthest CPU 100D is selected as the dump-dedicated CPU.

Figure 6:
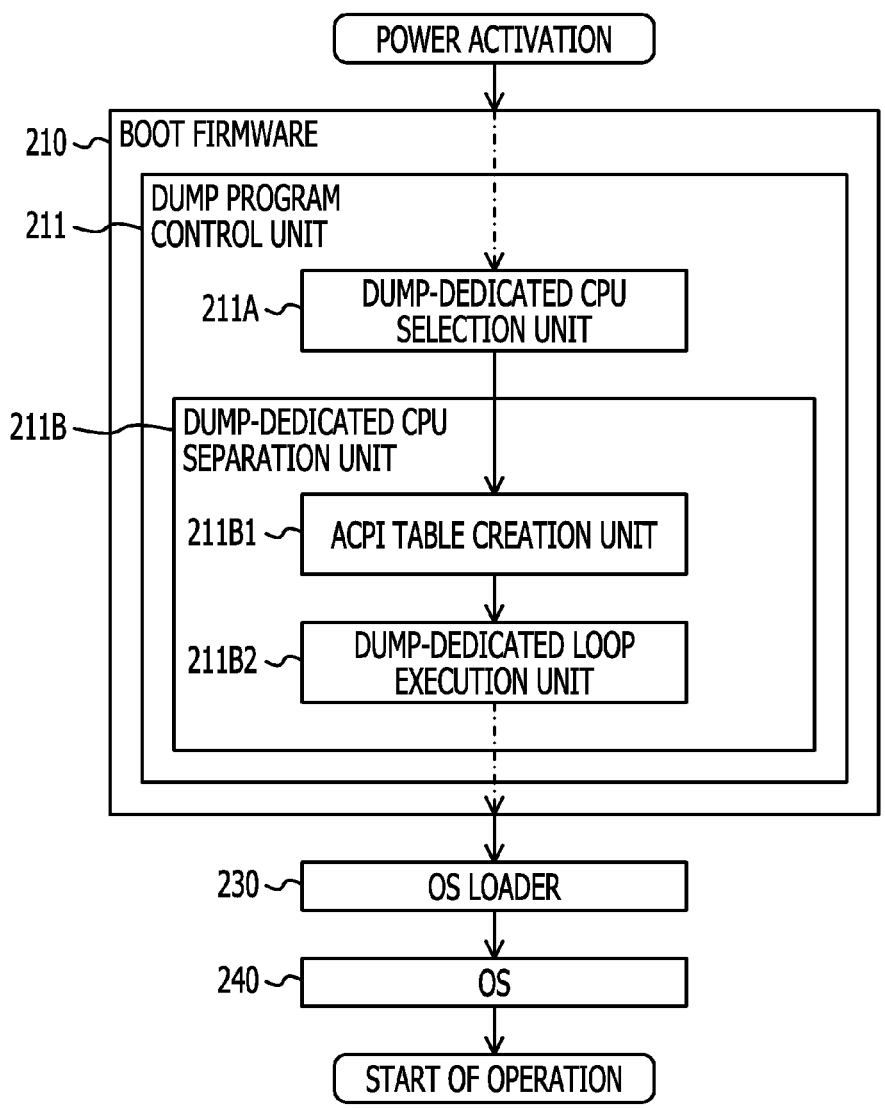
FIG. 6 is a diagram illustrating a diagram of a dump program control unit at the time of activation of an information processing device in the present embodiment.

FIG. 6 is a diagram explaining the processing of a dump program control unit at the time of the activation of the information processing device 1000 in the present embodiment. In FIG. 6, the same symbol is assigned to the same configuration as the configuration described in FIG. 1 to FIG. 5, and the description thereof will be omitted. FIG. 6 is a diagram explaining the boot firmware 210.

As illustrated in FIG. 6, after the power activation of the information processing device 1000, the dump-dedicated CPU selection unit 211A in the dump program control unit 211 selects one dump-dedicated CPU from among the CPUs 100B to 100D in the nodes 11 to 13.

The dump-dedicated CPU separation unit 211B performs processing for separating the selected dump-dedicated CPU from the normal operational system CPU and not allowing the selected dump-dedicated CPU to be used by the OS 240. When creating the ACPI table, the ACPI table creation unit 211B1 creates the ACPI table from which the dump-dedicated CPU is removed. Next, the dump-dedicated loop execution unit 211B2 instructs the selected dump-dedicated CPU to perform a wait loop from the boot firmware 210.

Owing to the dump-dedicated CPU separation unit 211B, it is possible for the CPU 100D operating as the dump-dedicated CPU to execute memory dump processing independently of the OS 240. Therefore, in the information processing device 1000 executing a virtual machine whose interrupt processing is not available for the OS 240, it is also possible to execute a memory dump.

Next, the OS loader 230 causes the OS stored in the hard disk 400 to be read into the main memories 200A to 200D. The OS 240 read into the main memories 200A to 200D is executed by the CPU 100A. The executed OS 240 includes a plurality of types. The OS 240 includes a virtual machine program where a plurality of virtual machines emulating a physical machine on the OS 240 operate.

Figure 7:
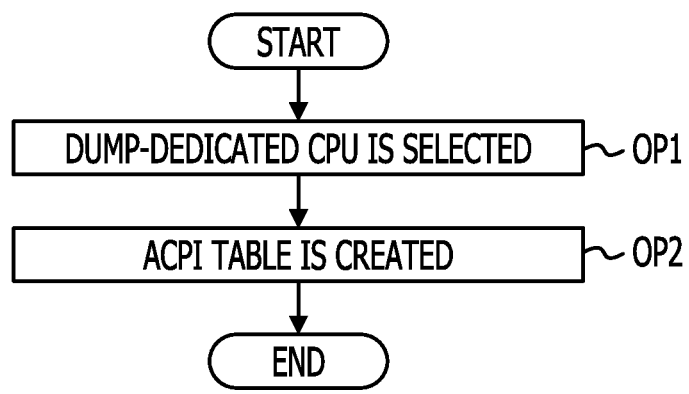
FIG. 7 is a flowchart of a dump program control unit in the present embodiment.

FIG. 7 is a diagram explaining the processing of the dump program control unit 211 in the present embodiment. In FIG. 7, the same symbol is assigned to the same configuration as the configuration described in FIG. 1 to FIG. 6, and the description thereof will be omitted.

As illustrated in FIG. 7, the dump program control unit 211 selects the dump-dedicated CPU (OP1). Next, the dump program control unit 211 creates the ACPI table (OP2).

Figure 8:
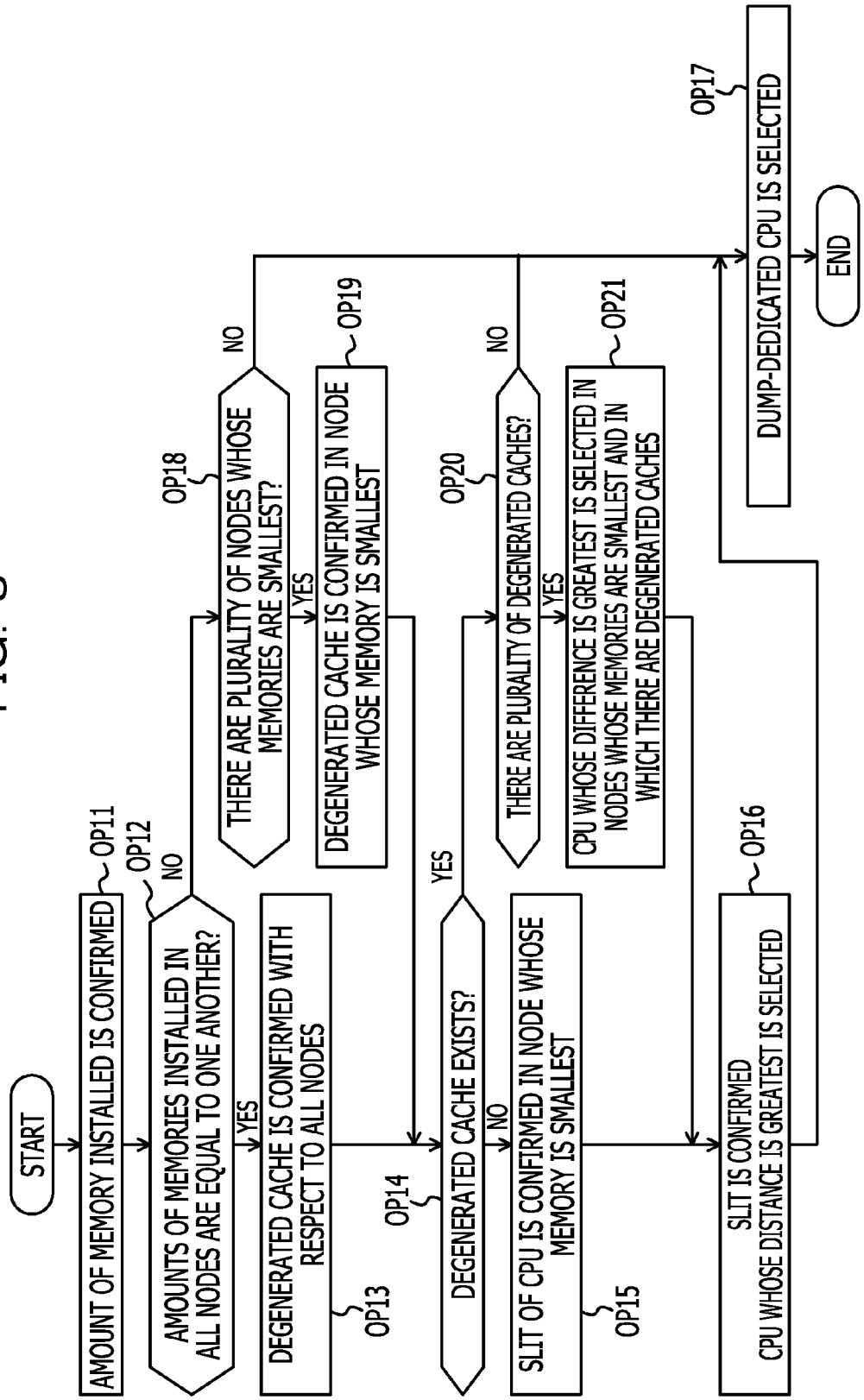
FIG. 8 is a flowchart of selection processing in a dump-dedicated CPU in the present embodiment.

FIG. 8 is a diagram explaining selection processing for the dump-dedicated CPU in the dump program control unit 211 in the present embodiment. In addition, in the present embodiment, the CPU 100A is preliminarily selected as the SBSP. In FIG. 8, the same symbol is assigned to the same configuration as the configuration described in FIG. 1 to FIG. 7, and the description thereof will be omitted.

As illustrated in FIG. 8, the dump program control unit 211 confirms the capacities of the whole areas of the memories of the main memories 200B to 200D in the nodes 11 to 13 (OP11). Next, the dump program control unit 211 determines whether all the capacities of the whole areas of the memories of the main memories 200B to 200D in the nodes 11 to 13 are equal to one another (OP12). When all the capacities of the whole areas of the memories of the main memories 200B to 200D are equal to one another (OP12: Y), the dump program control unit 211 confirms the presences or absences of the degeneracies of the cache memories 300B to 300D in the nodes 11 to 13 (OP13). In addition, when all the capacities of the whole areas of the memories of the main memories 200B to 200D are not equal to one another (OP12: N), the dump program control unit 211 confirms whether there are a plurality of main memories where the capacities of the whole areas of the memories thereof are the smallest, within the main memories 200B to 200D (OP18).

After having confirmed the presences or absences of the degeneracies of the cache memories 300B to 300D in the nodes 11 to 13 (OP13), the dump program control unit 211 confirms whether degeneracies in the cache memories 300B to 300D in the nodes 11 to 13 exist (OP14). When no degeneracy in the cache memories 300B to 300D exists (OP14: N), the dump program control unit 211 confirms the SLIT between a plurality of main memories where the capacities of the whole areas of the memories thereof are the smallest (OP15). When a degeneracy exists in one of the cache memories 300B to 300D (OP14: Y), the dump program control unit 211 confirms whether a plurality of degenerated cache memories exist (OP20).

When no degeneracy in the cache memories 300B to 300D exists (OP14: N), the dump program control unit 211 confirms an SLIT number serving as the CPU 100A of the SBSP (OP15). From among the CPUs 100B to 100D, the dump program control unit 211 selects a CPU farthest away from the CPU 100A of the SBSP (OP16). Next, the dump program control unit 211 selects, as the dump-dedicated CPU, the CPU farthest away from the CPU 100A of the SBSP (OP17).

In addition, when there are a plurality of main memories where the capacities of the whole areas of the memories thereof are the smallest, within the main memories 200B to 200D (OP18: Y), the dump program control unit 211 confirms whether there is a degenerated cache memory within the cache memories of nodes including the main memories where the capacities of the whole areas of the memories thereof are the smallest (OP19). When there are not a plurality of main memories where the capacities of the whole areas of the memories thereof are the smallest (OP18: N), the dump program control unit 211 transfers to the processing in the OP17.

In addition, when a plurality of degenerated cache memories exist (OP20: Y), the dump program control unit 211 selects a CPU farthest away from the CPU 100A of the SBSP, within nodes in which a plurality of main memories where the capacities of the whole areas of the memories thereof are the smallest exist and in which degenerated cache memories exist (OP21). When a plurality of degenerated cache memories do not exist (OP20: N), the dump program control unit 211 selects, as the dump-dedicated CPU, a CPU within a node in which a degenerated cache memory exists (OP17).

Figure 9:
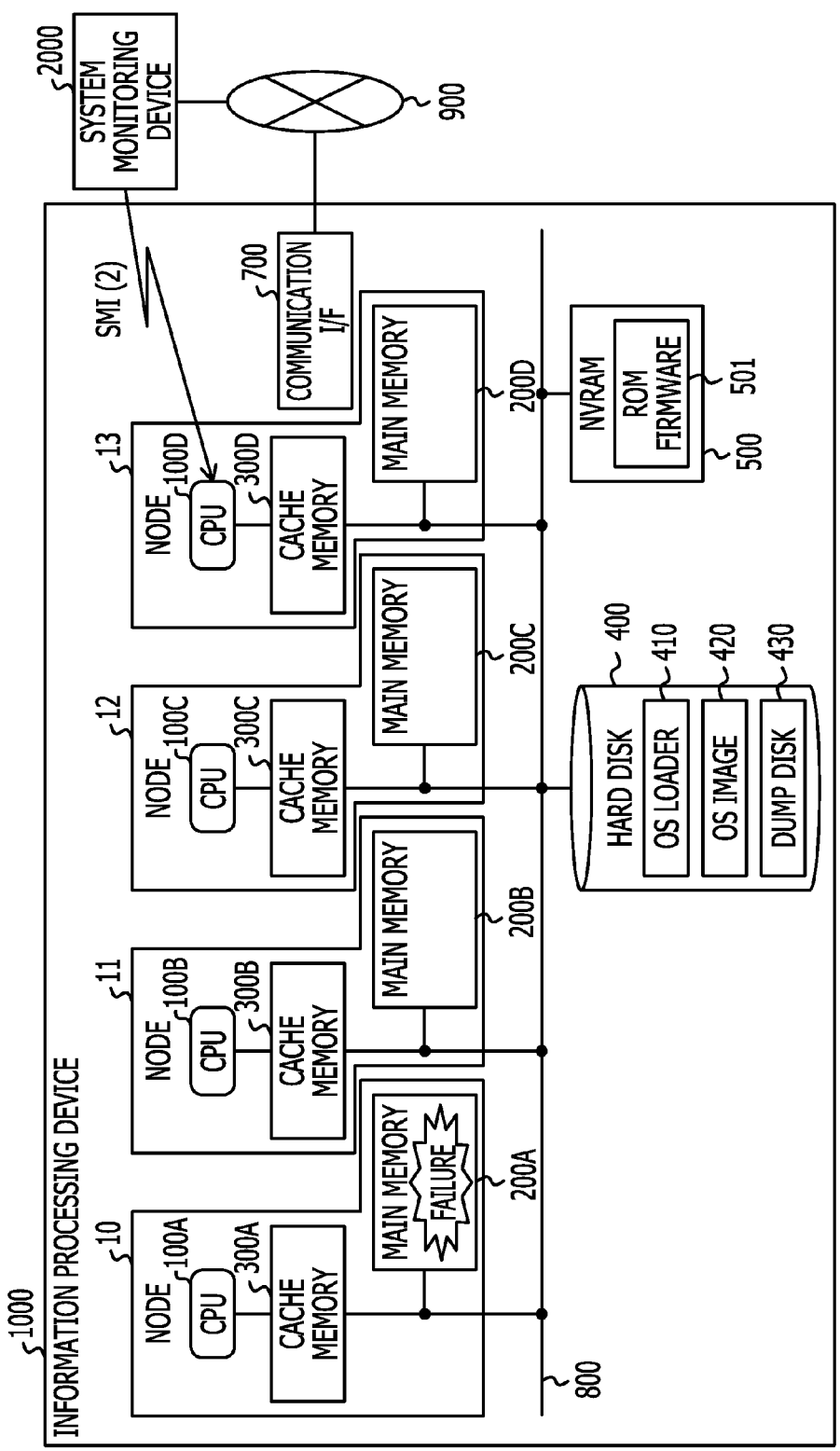
FIG. 9 illustrates a diagram explaining interrupt processing at the time of a failure occurrence in the present embodiment.

FIG. 9 illustrates a diagram explaining interrupt processing at the time of a failure occurrence in the present embodiment. In FIG. 9, the same symbol is assigned to the same configuration as the configuration described in FIG. 1 to FIG. 8, and the description thereof will be omitted.

In FIG. 9, the CPU 100A in the node 10 operates as the SBSP. The CPU 100B in the node 11 and the CPU 100C in the node 12 operate as APs. In the CPU 100B and the CPU 100C, which operate as the APs, virtual machines operate on the OS. To the CPU 100D operating as the dump-dedicated CPU, an instruction to wait for the issue of a Startup Inter-Processor Interrupt (SIPI) is issued by the boot firmware 210. The SIPI is an interrupt used in order for the CPU 100A operating as the SBSP to activate the CPU 100D operating as the dump-dedicated CPU, in the multiprocessor configuration of the information processing device 1000.

As illustrated in FIG. 9, it is assumed that when, in the node 10, a virtual machine is operating on the OS, the processing of the information processing device 1000 is halted owing to a failure in the OS. In such a case, the system monitoring device 2000 issues an SMI to all the CPUs in the information processing device 1000 so as to cause memory dumps to be executed.

Figure 10:
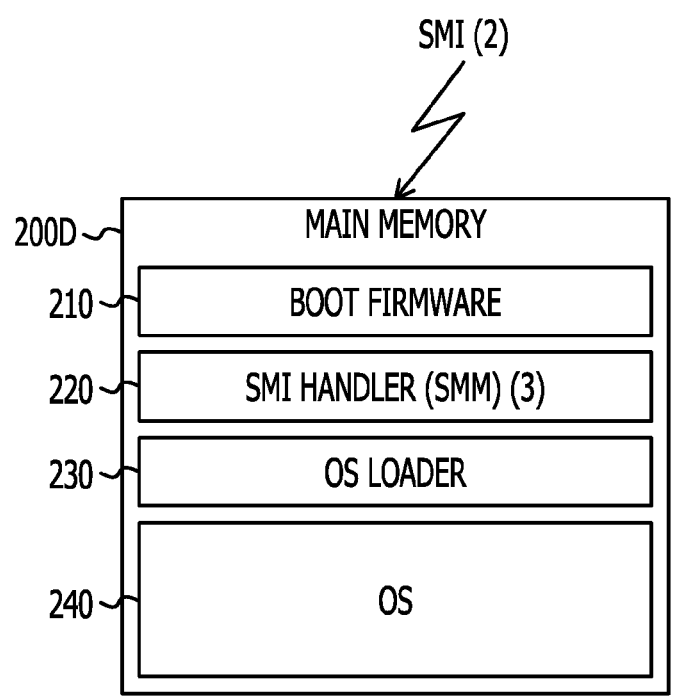
FIG. 10 illustrates a diagram explaining interrupt processing in a main memory at the time of a failure occurrence in the present embodiment.

FIG. 10 illustrates a diagram explaining interrupt processing in a main memory at the time of a failure occurrence in the present embodiment. In FIG. 10, the same symbol is assigned to the same configuration as the configuration described in FIG. 1 to FIG. 9, and the description thereof will be omitted.

As illustrated in FIG. 10, after a failure has occurred in the OS in the node 10, the system monitoring device 2000 issues an SMI to all the CPUs so as to cause memory dumps to be executed. A CPU having received the issue of the SMI causes the control of the information processing device 1000 to transfer to the SMM. The CPU 100A serving as the SBSP having transferred to the SMM executes the SMI. The SMI is a program processing an SMI within an independent address space within the memory spaces of the main memories 200A to 200D, the independent address space being inaccessible from another operation mode. When the processing of the SMI handler 220 has been completed, all the CPUs return to modes before the SMM transfer.

Figure 11:
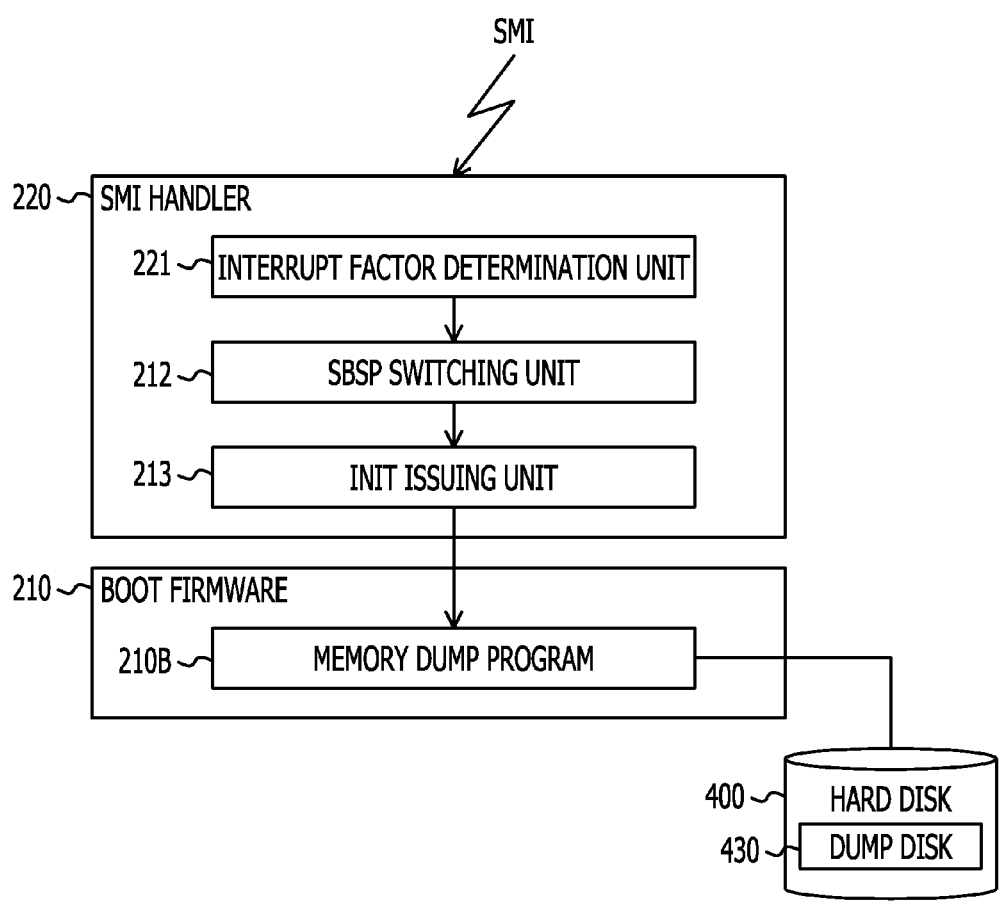
FIG. 11 illustrates a diagram explaining processing of a dump program control unit at the time of a failure occurrence in the present embodiment.

FIG. 11 illustrates a diagram explaining the processing of a dump program control unit at the time of a failure occurrence in the present embodiment. The SMI handler 220 includes an interrupt factor determination unit 221, an SBSP switching unit 212, and an INIT issuing unit 213. The boot firmware 210 includes the memory 210B. The hard disk 400 includes the dump disk 430. In FIG. 11, the same symbol is assigned to the same configuration as the configuration described in FIG. 1 to FIG. 10, and the description thereof will be omitted.

When having detected the occurrence of system hang or an OS panic, which is a failure too serious to continue processing in the OS 240 in the node 10, the CPU 100D operating as the dump-dedicated CPU performs the dump of a system memory, desired for finding the cause of the failure of the OS. When the dump of the system memory is desired, first the system monitoring device 2000 causes the SMI to occur, and transfers control to the SMI handler 220.

First, the interrupt factor determination unit 221 executes interrupt factor determination processing. The interrupt factor determination unit 221 confirms which factor has resulted in the occurrence of the interrupt. Specifically, the interrupt factor determination unit 221 confirms whether the interrupt of a dump instruction has resulted in the occurrence of the interrupt.

The SBSP switching unit 212 performs processing for switching, to the SBSP, the CPU 100D serving as the dump-dedicated CPU and having performed a wait loop. In addition, the SBSP switching unit 212 performs processing for switching all the normal operational system CPUs (the 100A to the 100C) to performing wait loops. The CPU 100A operating as the SBSP issues, to the CPU 100D, an instruction to switch so that the CPU 100D serving as the dump-dedicated CPU and not having operated in a virtual machine mode only operates. Therefore, owing to the CPU 100D, it is possible for the SBSP switching unit 212 to create an environment where an INIT interrupt is executable. The INIT interrupt processing is interrupt processing used for initializing the OS 240 in the node 10 where a failure such as system hang or an OS panic has occurred.

The INIT issuing unit 213 issues the INIT interrupt to the CPU 100D operating as the dump-dedicated CPU. Owing to the INIT interrupt, in the CPU 100D, an execution address is transferred to a reset entry. In other words, without implementing the Warm Reset that does not turn off the power supply of the information processing device 1000 at the time of the reset of the information processing device 1000, it is possible for the CPU 100D to transfer the memory dump processing to the boot firmware 210. In an environment where a virtual OS such as Xen has operated, the CPU 100D is only transferred to the reset entry. The reset entry is activated by the INIT issuing unit 213 in the SMI handler 220. The reset entry is processing for executing initialization on the CPU 100A in the node 10 where the failure has occurred, and the main memory 200A and the cache memory 300A, which serve as the peripheral devices of the node 10 and are desired to be initialized at the time of reset.

The CPU 100D operating as the dump-dedicated CPU executes the memory dump program 210B in the boot firmware 210. By executing the memory dump program 210B, the CPU 100D dumps the data of the main memory 200A in the node 10 where the failure has occurred, to the dump disk 430 preliminarily designated.

Figure 12:
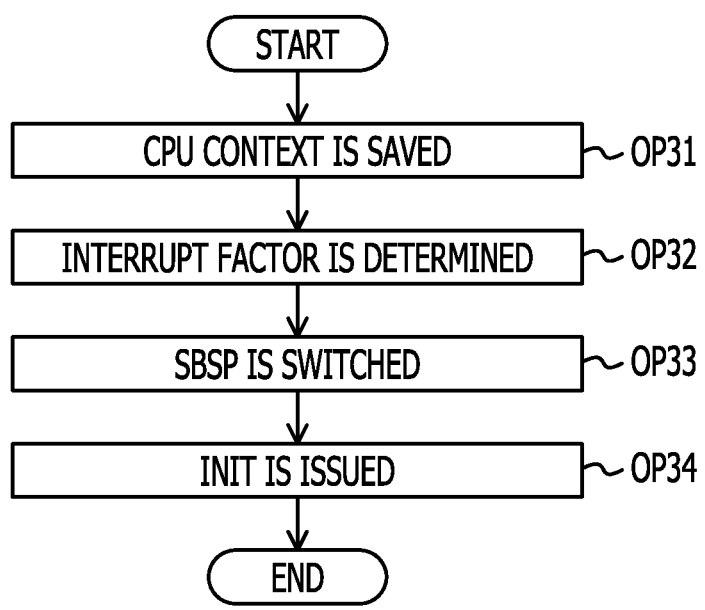
FIG. 12 is a flowchart illustrating control processing after transferring to a System Management Mode (SMM) at the time of a failure occurrence in the present embodiment.

FIG. 12 is a flowchart illustrating control processing after transferring to an SMM at the time of a failure occurrence in the present embodiment. In FIG. 12, the same symbol is assigned to the same configuration as the configuration described in FIG. 1 to FIG. 11, and the description thereof will be omitted.

As illustrated in FIG. 12, first a CPU having transferred to the SMM executes processing for saving CPU context information (OP31). An area into which the CPU saves the CPU context information is a memory space whose presence is invisible from the OS 240 in the node 10 where the failure has occurred.

The SBSP executes interrupt factor determination processing for identifying the factor of an interrupt (OP32). The interrupt factor determination processing is processing for determining whether or not a memory dump has been ordered. When the interrupt factor has been identified as a memory dump instruction, first the SBSP creates a memory dump instruction flag in the NVRAM 500. The memory dump instruction flag is used for identifying whether activation after the execution of the reset of the OS 240 in the node 10 is normal activation or activation used for a memory dump. In addition, the SBSP stores, in the NVRAM 500, the memory address of the area into which the CPU context has been saved.

The CPU 100A serving as the SBSP executes SBSP switching processing (OP33). The SBSP switching processing is processing for causing the CPU 100A having operated as the SBSP to perform a wait loop and causing the CPU 100D operating as the dump-dedicated CPU to operate as the SBSP.

The CPU 100D executes INIT issuing processing (OP34). The INIT issuing processing is processing where the CPU 100D operating as the dump-dedicated CPU issues an INIT and the processing of the CPU 100D operating as the dump-dedicated CPU is transferred to the reset entry.

Figure 13:
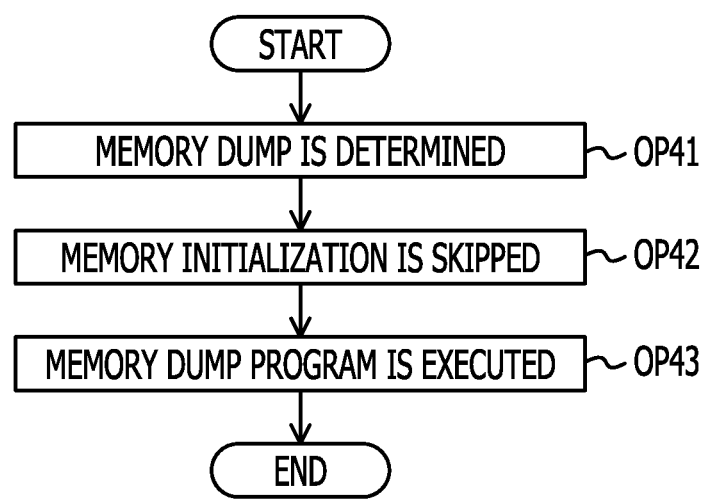
FIG. 13 is a flowchart illustrating memory dump processing at the time of a failure occurrence in the present embodiment.

FIG. 13 is a flowchart illustrating memory dump processing at the time of a failure occurrence in the present embodiment. FIG. 13 is a flowchart illustrating processing operations ranging from a reset entry to a memory dump. In FIG. 13, the same symbol is assigned to the same configuration as the configuration described in FIG. 1 to FIG. 12, and the description thereof will be omitted.

As illustrated in FIG. 13, when processing has transferred to the reset entry, first the CPU 100D executes memory dump determination processing (OP41). The CPU 100D confirms the memory dump instruction flag stored in the NVRAM 500. By confirming the memory dump instruction flag, the CPU 100D confirms whether activation after the execution of the reset of the OS 240 is normal activation or activation used for a memory dump.

The CPU 100D executes memory initialization skip processing (OP42). When having confirmed that the activation after the execution of the reset of the OS 240 is the activation used for a memory dump, the CPU 100D skips without performing the initialization of the main memories 200A to 200D, the initialization being to be performed in the case of the normal activation.

The CPU 100D executes a memory dump program (OP43). After the initialization of I/O and so forth, not illustrated, having been performed, the CPU 100D executes the memory dump program. The CPU 100D executes the memory dumps of the main memories 200A to 200D. At the time of the execution of a memory dump, the CPU 100D collects the CPU context information preliminarily saved.

After the completion of the memory dump, the CPU 100D clears the memory dump instruction flag stored in the NVRAM 500.

FIG. 14 and FIG. 15 are sequence diagrams illustrating the processing operations of the CPU 100A operating as an SBSP, the CPU 100B operating as an AP, and the CPU 100D operating as a dump-dedicated CPU at the time of a failure occurrence in the present embodiment. The processing operations illustrated in A in FIG. 14 lead to A in FIG. 15. In FIG. 14 to FIG. 15, the CPU 100A operating as the SBSP and the CPU 100B operating as the AP operate the OS 240. In FIG. 14 and FIG. 15, the same symbol is assigned to the same configuration as the configuration described in FIG. 1 to FIG. 13, and the description thereof will be omitted.

As illustrated in FIG. 14, at the time of the operation of the OS 240 (OP51), the CPU 100A operating as the SBSP performs a normal operation (OP52). At the time of the operation of the OS 240 (OP51), the CPU 100B operating as the AP performs a normal operation in the same way as the CPU 100A operating as the SBSP (OP53). To the CPU 100D operating as the dump-dedicated CPU, an instruction to wait for the issue of an SIPI is issued by the boot firmware 210 (OP54).

When a failure such as the system hang or the OS panic has occurred in the OS 240 (OP55), the CPU 100A operating as the SBSP hangs up on the OS 240 (OP56). When a failure such as the system hang or the OS panic has occurred (OP55), the CPU 100B operating as the AP hangs up on the OS 240 in the same way as the CPU 100A operating as the SBSP (OP57).

When having detected the failure of the OS 240, the system monitoring device 2000 issues SMIs to the CPU 100A operating as the SBSP, the CPU 100B operating as the AP, and the CPU 100D operating as the dump-dedicated CPU (OP58). The CPU 100A operating as the SBSP, the CPU 100B operating as the AP, and the CPU 100D operating as the dump-dedicated CPU, to which the SMIs have been issued, transfer to an SMM (OP59).

In the SMM, the CPU 100A operating as the SBSP executes the interrupt factor determination processing described above in the OP32 in FIG. 12 (OP60). In addition, when, in the OP60, it has been determined that the interrupt factor is not a memory dump, the CPU 100A operating as the SBSP only operates in the SMM. After the completion of the memory dump of the CPU 100A, the CPU 100B and the CPU 100D return to processing operations before the interrupt after having implemented the restoration of the CPU context stored in the NVRAM 500.

The CPU 100B operating as the AP having transferred to the SMM transfers to a wait loop (OP61). The CPU 100D operating as the dump-dedicated CPU having transferred to the SMM transfers to a wait loop in the same way as the CPU 100B operating as the AP (OP62).

The CPU 100A operating as the SBSP executes the switching processing for the SBSP, described above in the OP33 in FIG. 12 (OP63). To the CPU 100D operating as the dump-dedicated CPU, the CPU 100A operating as the SBSP issues a switching command for operating as the SBSP. On the basis of the switching command issued from the CPU 100A, the CPU 100D operating as the dump-dedicated CPU starts an operation as the SBSP (OP64). The CPU 100A having issued the switching command transfers to a wait loop (OP65).

The CPU 100D operating as the dump-dedicated CPU issues, to all the CPUs, the INIT commands described above in the OP34 in FIG. 12 (OP71). After the issue of the INIT commands, the CPU 100D transfers to the reset entry processing described above in FIG. 11 (OP72).

The CPU 100D operating as the dump-dedicated CPU performs the memory dump determination processing described above in the OP41 in FIG. 13 (OP73). Next, the CPU 100D executes the memory initialization skip processing described above in the OP42 in FIG. 13 (OP74). The CPU 100D executes the memory dump program described above in the OP43 in FIG. 13 (OP75).

According to the technology disclosed in the present embodiment, it is possible for the CPU 100D operating as the dump-dedicated CPU to perform memory dump processing independently from the OS 240. Therefore, in the information processing device 1000 executing a virtual machine whose interrupt processing is not available for the OS 240, it is also possible to execute a memory dump.

Furthermore, a plurality of processors are included that have cache memories, and a CPU having the smallest available cache memory is selected to be used for a memory dump. By causing the other processors to perform usual processing, it is possible to suppress the reduction of a processing capacity when a memory dump is performed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device comprising:
   a memory; and
   a plurality of processors coupled to the memory, the plurality of processors including cache memories, respectively, wherein
   a first processor of the plurality of processors is configured to:
      generate information indicating capacities of the cache memories included in the plurality of processors, respectively, and
      select a processor of the plurality of processors based on the generated information, the selected processor including the cache memory having the smallest capacity among the plurality of cache memories, and
   the selected processor executes memory dump processing for the memory.

2. The information processing device according to claim 1, wherein
   the first processor is configured to allocate a plurality of areas of the memory to the plurality of processors, and
   the selected processor has the allocated area of which capacity is smallest among the plurality of areas.

3. The information processing device according to claim 1, wherein
   a processor of the plurality of processors other than the selected processor executes virtual machine processing.

4. The information processing device according to claim 1, wherein
   the plurality of processors are included in a plurality of nodes, respectively, and the first processor is included in a first node of the plurality of nodes,
   the information further indicates distances between the first node and each of the plurality of nodes other than the first node, and the selected processor is included in one of the plurality of nodes which is the longest distance from the first node.

5. An information processing device comprising:
a memory including a plurality of areas; and
a plurality of processors coupled to the memory, the plurality of areas of the memory being allocated to the plurality of processors, respectively, wherein
a first processor of the plurality of processors is configured to
generate information indicating capacities of the plurality of areas of the memory allocated to the plurality of processors, respectively, and
select a processor of the plurality of processors based on the generated information, the selected processor including the area of the memory having the smallest capacity among the plurality of areas of the memory, and
the selected processor executes memory dump processing for the memory.

6. The information processing device according to claim 5, wherein
each of the plurality of processors includes a cache memory, and
the selected processor which has a cache memory of which capacity is smallest among the plurality of cache memories.

7. The information processing device according to claim 5, wherein
a processor other than the selected processor executes virtual machine processing.

8. The information processing device according to claim 5, wherein
the plurality of processors are included in a plurality of nodes, respectively, and the first processor is included in a first node of the plurality of nodes,
the information further indicates distances between the first node and each of the plurality of nodes other than the first node, and
the selected processor is included in one of the plurality of nodes which is the longest distance from the first node.

9. An information processing method utilizing a memory and a plurality of processors each of which includes cache memory configured to access the memory, the information processing method comprising:
generating information indicating capacities of the cache memories included in the plurality of processors, respectively;
selecting a processor among the plurality of processors based on the generated information, the selected processor including the cache memory of which capacity is smallest among the plurality of cache memories; and
executing memory dump processing for the memory using the selected processor.

10. The information processing method according to claim 9, further comprising:
allocating a plurality of areas of the memory to the plurality of processors; and respectively,
wherein the selecting the processor comprises selecting the processor which has the allocated area of with a capacity which is smallest among the plurality of areas of the memory.

11. The information processing method according to claim 9, wherein
a processor of the plurality of processors other than the selected processor, executes virtual machine processing.

12. The information processing method according to claim 9, wherein
the plurality of processors are included in a plurality of nodes, respectively, and the first processor is included in a first node of the plurality of nodes,
the information further indicates distances between the first node and each of the plurality of nodes other than the first node, and
the selected processor is included in one of the plurality of nodes which is the longest distance from the first node.

13. An information processing method utilizing a memory and a plurality of processors configured to access the memory, the memory including a plurality of areas, the plurality of areas of the memory being allocated to the plurality of processors, respectively, the information processing method comprising:
generating information indicating capacities of the plurality of areas of the memory allocated to the plurality of processors, respectively;
selecting a processor of the plurality of processors based on the generated information, the selected processor including the area of the memory having the smallest capacity among the plurality of areas of memory; and
executing memory dump processing for the memory using the selected processor.

14. The information processing method according to claim 13, wherein
each of the plurality of processors includes cache memory, and the selected processor includes a cache memory with a capacity which is smallest among the plurality of cache memories.

15. The information processing method according to claim 13, wherein
a processor of the plurality of processors other than the selected processor, executes virtual machine processing.

16. The information processing method according to claim 13, wherein
the plurality of processors are included in a plurality of nodes, respectively, and the first processor is included in a first node of the plurality of nodes,
the information further indicates distances between the first node and each of the plurality of nodes other than the first node, and
the selected processor is included in one of the plurality of nodes which is the longest distance from the first node.

* * * * *